United States Patent
Kawamura et al.

(10) Patent No.: US 7,124,294 B2
(45) Date of Patent: Oct. 17, 2006

(54) ELECTRONIC CERTIFICATE SYSTEM

(75) Inventors: Shunji Kawamura, Kawasaki (JP); Taminori Tomita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 914 days.

(21) Appl. No.: 10/059,332

(22) Filed: Jan. 31, 2002

(65) Prior Publication Data

US 2003/0093676 A1    May 15, 2003

(30) Foreign Application Priority Data

Nov. 13, 2001 (JP) ............................. 2001-346848

(51) Int. Cl.
*H04L 9/00* (2006.01)
*G06F 7/04* (2006.01)

(52) U.S. Cl. .................. 713/156; 713/158; 726/10

(58) Field of Classification Search ................ 713/156, 713/158; 726/10
See application file for complete search history.

(56) References Cited

U.S. PATENT DOCUMENTS 5,712,914 A * 1/1998 Aucsmith et al. .......... 380/30
6,564,323 B1   5/2003 Takahashi et al.
6,754,665 B1   6/2004 Futagami et al.
2002/0013772 A1*   1/2002 Peinado ........................ 705/51
2002/0035686 A1*   3/2002 Creighton et al. .......... 713/156
2002/0053023 A1*   5/2002 Patterson et al. .......... 713/156

FOREIGN PATENT DOCUMENTS

JP    11-149504    6/1999
JP    123095 A     4/2000
JP    2001-5833    1/2001

* cited by examiner

*Primary Examiner*—Jacques H. Louis-Jacques
*Assistant Examiner*—Christopher J. Brown
(74) *Attorney, Agent, or Firm*—Mattingly, Stanger, Malur & Brundidge, P. C.

(57) ABSTRACT

In order to limit users who can check for validity of a certificate in a system which uses public key certificates, a validity check permit permitting a request to check for validity of the certificate is issued by a permit issuing server 120 to the applicant of the certificate. The certificate applicant sends the validity check permit to a relevant user when the certificate is used (step 701). When having a certificate validity checking server check for validity of the certificate, the user sends the validity check permit of the certificate to be checked to the certificate validity checking server (step 704). The certificate validity checking server verifies the validity check permit (step 706).

37 Claims, 11 Drawing Sheets

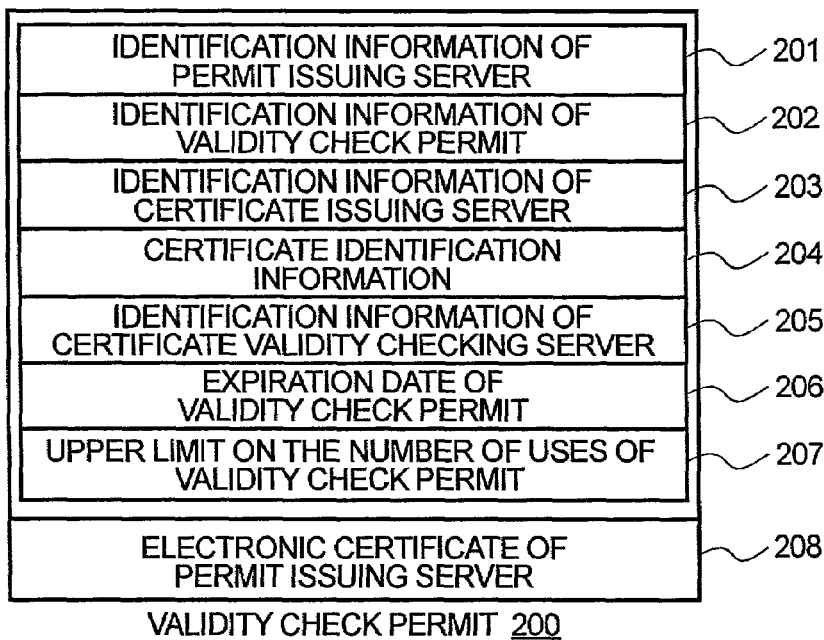

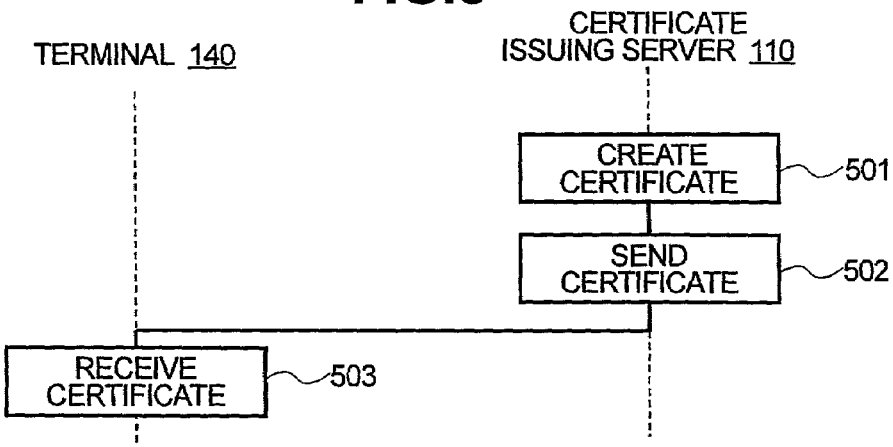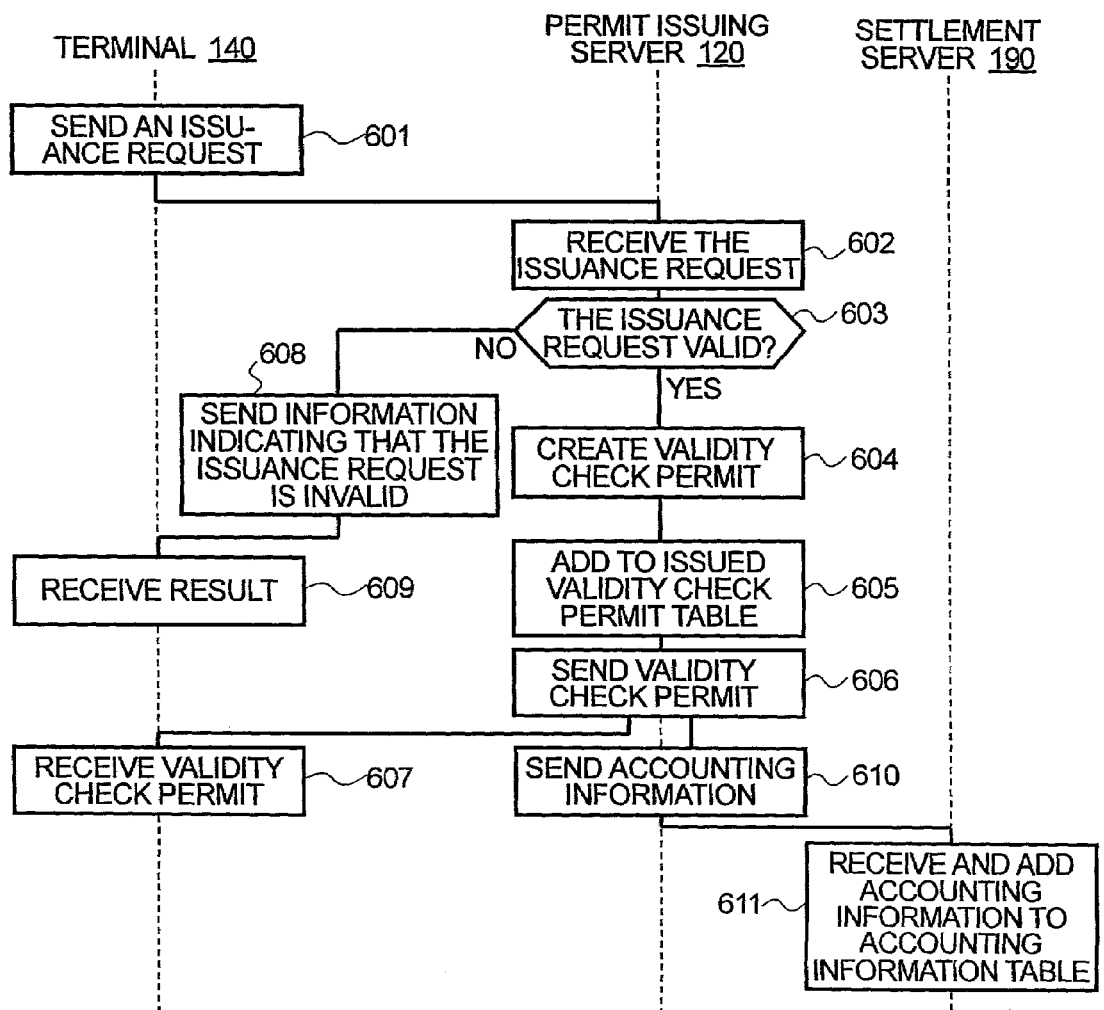

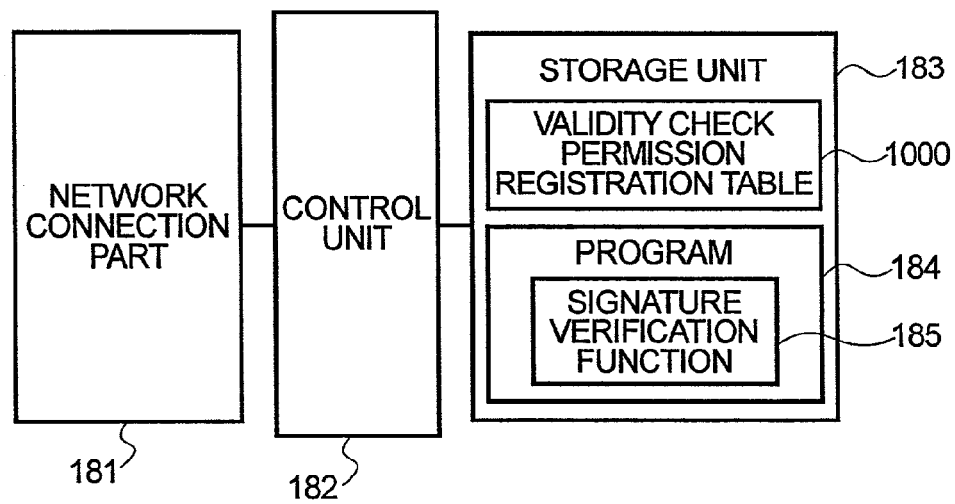

FIG.15

| PAYER'S IDENTIFICATION INFORMATION | RECEIVER'S IDENTIFICATION INFORMATION | CHARGED AMOUNTS | OCCURRENCE DATE | OCCURRENCE REASON |
|---|---|---|---|---|
| 1501 | 1502 | 1503 | 1504 | 1505 |
|  |  |  |  |  |
|  |  |  |  |  |
|  |  |  |  |  |

ACCOUNTING INFORMATION TABLE 1500

ELECTRONIC CERTIFICATE SYSTEM

BACKGROUND OF THE INVENTION

The present invention relates to a system which uses a network for providing services. The present invention also includes apparatuses and program products constituting the system. The present invention relates in particular to a certificate validity checking method and apparatus, especially for use in a system using certificates based on a public key.

A method of providing services in a system using a network is disclosed in Japanese Published Unexamined Patent Application No. 2000-123095. In this publication, a technique is disclosed which defines many different types of electronic tickets for general purpose use to provide services.

A recent major trend in electronic commerce and communications is toward authentication processing using public-key-based certificates (hereinafter referred to as public key certificates or simply as certificates), and communication encryption processing.

On an electronic certificate, there are provided an issuance date, an expiration date, the signature of an issuer, and the like, in addition to information co concerning the certifyee of the certificate. During the effective period, there should be no problem in the validity of the certificate itself.

However, it might become necessary to nullify the certificate during the effective period because of loss or theft of the secret key corresponding to the certificate, or due to company retirement. This is called certificate nullification processing. An authentication station periodically (e.g., twice per day) prepares and stores a nullification list containing a list of serial numbers of certificates that became null during the effective period. The nullification list is called a CRL (Certificate Revocation List) according to RFC (Request for Comments) 2459 of the IETF (Internet Engineering Task Force).

In applications (Web server, client, encrypted mail) using certificates, the validity of the certificate can not be confirmed without information about whether the certificate has been nullified. As a method of checking a certificate for validity (certificate validity checking method), a method has been employed by which users obtain a CRL by some method (periodic distribution by an authentication station to users or access to the authentication station by users), and confirm the validity of the certificate by confirming that there is no certificate information to be checked for validity in the CRL.

In applications using a CRL distributed from an authentication station, the CRL data must be analyzed to determine whether a certificate is nullified.

OCSP (Online Certificates Status Protocol) recommended as RFC 2560 of IETF lessens loads on the applications and defines a protocol for inquiring of an OCSP responder as to whether a certificate itself is valid.

The responder obtains and manages a nullification list issued from an authentication station, whereby the applications can manipulate a validity checking protocol called OCSP to check for the validity without the applications themselves searching the nullification list.

SUMMARY OF THE INVENTION

The above-described methods and procedures do not include a solution to the following points.

In Japanese Published Unexamined Patent Application No. 2000-123095, services provided from a server apparatus cannot be provided to third parties (third client apparatuses). Also, there is a problem in that the number of provisions, the time, and other factors cannot be limited.

Since there are no limitations on a request to check for the validity of a certificate for a server checking for the validity of a certificate, such as an OCSP responder, an indefinite number of users issue a certificate validity check request to the server, with the result that the server is highly loaded. It is readily expected that widespread use of a public key certificate will result in the frequent occurrence of certificate validity checking. Also, it is expected that the concentration of a large number of validity check request accesses to the server will cause an increase in the load on the server.

To solve the above-described problems, the present invention has the following configuration.

A service requesting apparatus used by a user requesting services, a service receiving apparatus used by a user receiving services, and a service providing apparatus performing information processing for providing services are connected with each other over a network, wherein the service providing apparatus receives a service request sent from the service receiving apparatus and determines whether to perform information processing for providing the service, based on a condition related to the service request, for performing information processing for the service receiving apparatus, the information processing being ascribable to processing of the service requesting apparatus.

According to the present invention, the above-described condition also includes the existence of permission information that allows provision or receipt of a service sent from the service requesting apparatus to the service receiving apparatus. The permission information may be created by either the service providing apparatus or the service requesting apparatus. Also, it may be created by a third apparatus.

The above-described condition includes the inclusion of the service receiving apparatus in an information processing apparatus registered in advance. In this case, information about the information processing apparatus is registered in the service providing apparatus. It may also be registered in an apparatus accessible from the service providing apparatus.

When a service request is received, the service providing apparatus sends out inquiry information about whether to provide the service to the service requesting apparatus. In this case, the above-described condition includes a reply to the inquiry. Also, information for identifying the service receiving apparatus is sent from the service providing apparatus to the service requesting apparatus.

The above-described condition includes information indicating limitations on a service to be provided. The limitations include at least one of a number of service provisions and a provision date.

Services include checking for validity of an electronic certificate. In this case, the service requesting apparatus is an information processing apparatus managed by an issuee of the certificate. The service receiving apparatus is an information processing apparatus that receives the certificate from the service requesting apparatus. Further, the service providing apparatus is a certificate validity checking server. The service providing apparatus may include an information processing apparatus that issues the certificate. Other services include distribution of information including programs, music, and images, and delivery of products including presents.

BRIEF DESCRIPTION OF THE DRAWINGS

FIG. 2 is a diagram showing the data structure of a validity check permit in the first embodiment.

FIG. 3 is a diagram showing the data structure of an issued validity check permit table in the first embodiment.

FIG. 4 is a diagram showing the data structure of a validity permit inspection table in the first embodiment.

FIG. 5 is a flowchart showing a certificate issuing procedure in a processing procedure in the first embodiment.

FIG. 6 is a flowchart showing a procedure for issuing a validity check permit in the processing procedure in the first embodiment.

FIG. 9 is a block diagram showing the configuration of a permission registration server according to a second embodiment.

FIG. 10 is a diagram showing the data structure of a validity check permission registration table in the second embodiment.

FIG. 15 is a diagram showing the data structure of an accounting information table according to an embodiment of the present invention.

DESCRIPTION OF THE PREFERRED EMBODIMENTS

First Embodiment

Hereinafter, a first embodiment of the present invention will be described.

Figure 1:
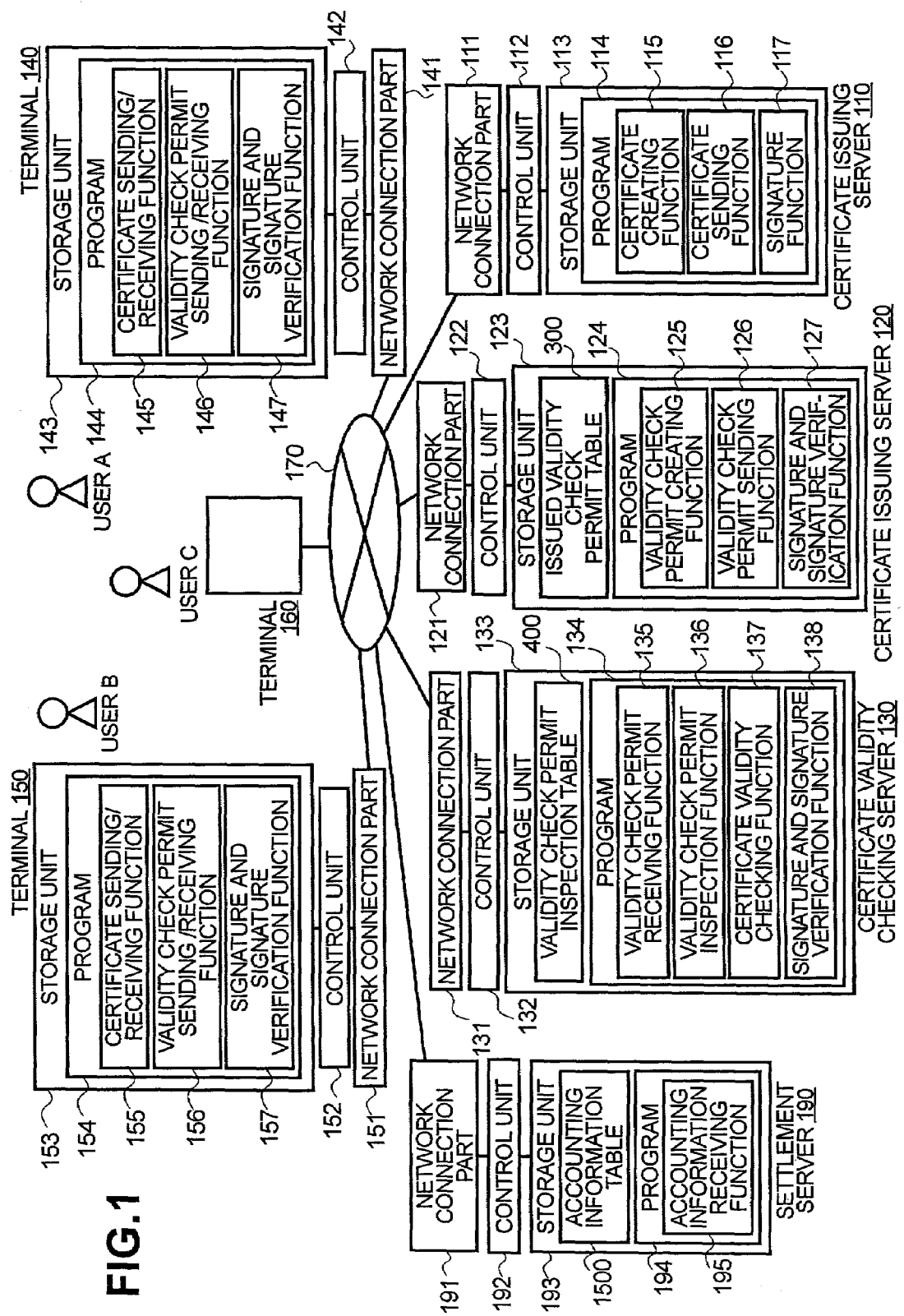
FIG. 1 is a block diagram of a system according to a first embodiment of the present invention.

FIG. 1 is a block diagram showing the configuration of a certificate validity checking system when the present invention is applied to a validity check service for a public key certificate.

In this specification, for a given user's public key, a server issuing a certificate of the key will be referred to as a certificate issuing server. For an inquiry about certificate validity from a terminal, a server that checks whether a certificate specified by the terminal is valid and that returns the result of the processing will be referred to as a certificate validity checking server. Information giving permission for a request to execute certificate validity check processing to the certificate validity checking server will be referred to as a validity check permit. A server that creates a validity check permit and sends it to the terminal will be referred to as a permit issuing server. A server that issues a validity check permit and holds information (accounting information) about charges imposed on users according to validity check processing will be referred to as a settlement server.

In FIG. 1, the system comprises a certificate issuing server 110, a permit issuing server 120, a certificate validity checking server 130, a settlement server 190, and terminals 140, 150 and 160 respectively used by user A, user B, and user C, who use a certificate validity check service.

The certificate issuing server 110, the permit issuing server 120, the certificate validity checking server 130, the settlement server 190, and the terminals 9 are respectively controlled by control units 112, 122, 132, 192, 142, and 152, and they respectively have network connection parts 111, 121, 131, 191, 141, and 151 for mutual data sending and receiving among them through connection with a network 170, such as the Internet, via a communication line.

Although three terminals are shown in FIG. 1, the present invention is not limited to three. Although the servers are respectively shown as only one each, there may exist plural servers having an identical function. Although the servers are separately shown, they may be embodied in a physically identical server.

The certificate issuing server 110 has a program having a certificate creating function 115, a certificate sending function 116 and a signature function 117 within a storage unit 113.

The permit issuing server 120 has a program 124, having a validity check permit creating function 125, a validity check permit sending function 126, and a signature and signature verification function 127, as well as an issued validity check permit table 300 within a storage unit 123.

The certificate validity checking server 130 has a program, having a validity check permit receiving function 135, a validity check permit inspection function 136, a certificate validity checking function 137, and a signature and signature verification function 138, as well as a validity check permit inspection table 400 within a storage unit 133.

The settlement server 190 has a program 194, having an accounting information receiving function 195, and an accounting information table 1500 within a storage unit 193.

The terminals 140 and 150 respectively have programs 144 and 154 respectively having certificate sending/receiving functions 145 and 155, validity check permit sending/receiving functions 146 and 156, and signature and signature verification functions 147 and 157 within storage units 143 and 153.

FIG. 2 is a diagram showing the data structure of a validity check permit.

The validity check permit 200 includes: identification information 201 of a permit issuing server; identification information 202 of a validity check permit; identification information 203 of a certificate issuing server; certificate identification information 204; identification information 205 of a certificate validity checking server; an expiration date of validity check permit 206; an upper limit 207 on the number of uses of a validity check permit; and an electronic signature 208 of a permit issuing server as information for verifying whether the validity check permit has been tampered with after being created.

If the validity check permit is valid, the certificate validity checking server checks for the validity of a public key certificate identified by the identification information 203 of the certificate issuing server and the certificate identification information 204 included in the validity check permit.

FIG. 3 is a diagram showing the data structure of the issued validity check permit table 300. The issued validity check permit table 300 consists of: identification information 301 of a validity check permit; identification information 302 of a certificate issuing server; certificate identification information 303; identification information 304 of certificate validity checking server; an expiration date 305 of validity check permit; and an upper limit 306 on the number of uses of validity check permit.

FIG. 4 is a diagram showing the data structure of the validity check permit inspection table 400.

The validity check permit inspection table 400 consists of: identification information 401 of a permit issuing server; identification information 402 of a validity check permit; an upper limit 403 on the number of uses of a validity check permit; and an accumulated number 404 of uses of a validity check permit.

FIG. 15 is a diagram showing the data structure of the accounting information table 1500.

Although, in this embodiment, functions and tables of servers and terminals exist within identical storage units and within identical programs, the functions may exist in different programs or different storage units.

Figure 7:
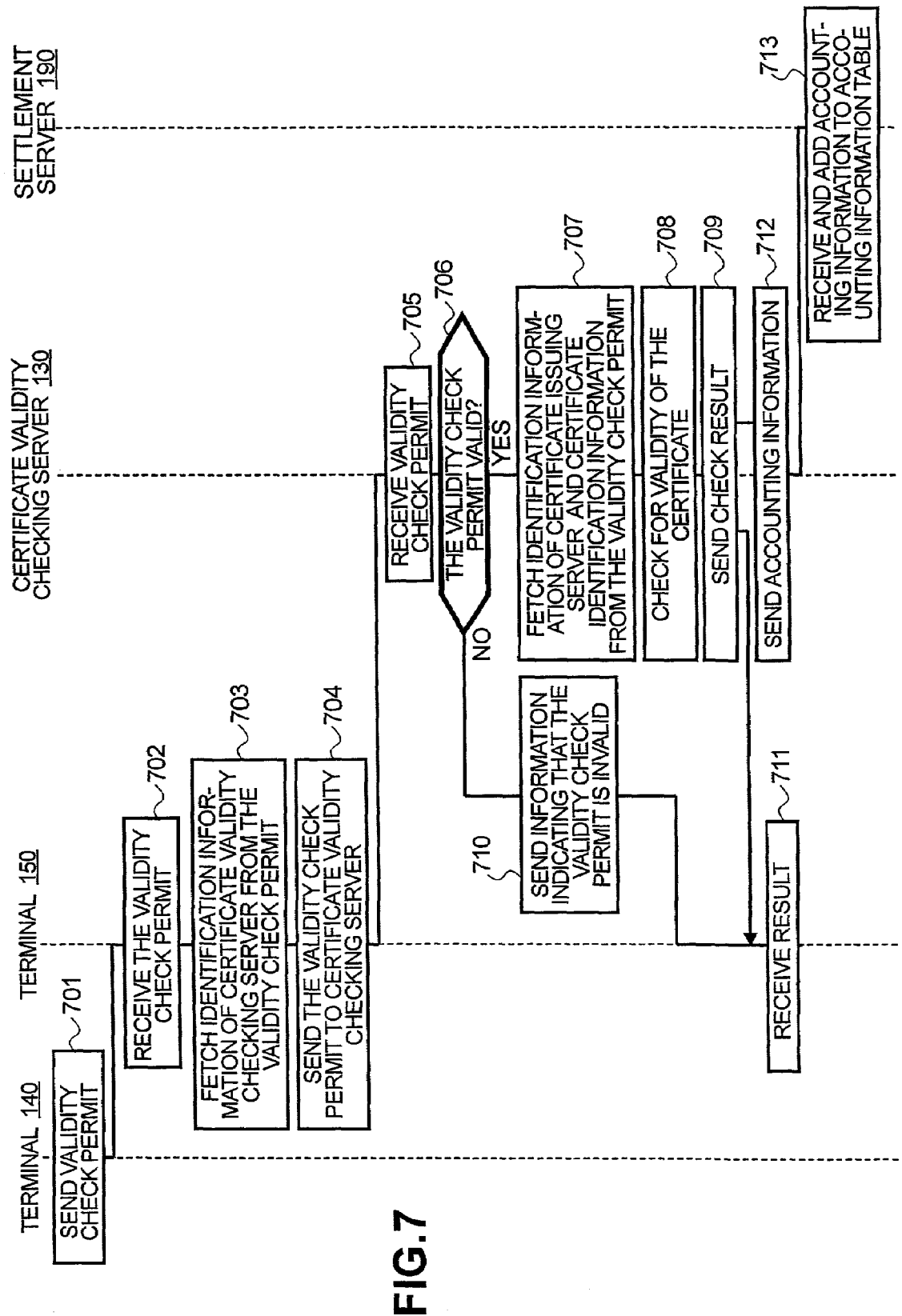
FIG. 7 is a flowchart showing a procedure for checking for validity of a certificate in the processing procedure in the first embodiment.

FIGS. 5, 6, and 7 are flowcharts showing a processing procedure of this embodiment. The operation of each part will be described based on the flowcharts. The certificate issuing server 110, for a certificate issuance request from a user A, creates the certificate using the certificate creating function 115 (step 501) and affixes an electronic signature of the certificate issuing server to the certificate as information for detecting a tampering with the certificate.

The certificate issuing server 110 sends the certificate to terminal 140 of the user A using the certificate sending function 116 via a network (step 502).

The terminal 140, using the certificate receiving function 145, receives and stores the certificate sent from the certificate issuing server 110 (step 503).

The terminal 140 sends a request to issue a validity check permit to the permit issuing server 120 (step 601). The issuance request includes identification information of the permit issuing server, identification information of the certificate of the user A, an upper limit on the number of uses of a validity check permit, and an expiration date of the validity check permit, and is provided with an electronic signature of the user A.

The permit issuing server 120 receives the issuance request (step 602), verifies the electronic signature using the signature and signature verification function 127, and confirms that the issuance request has been created by the user A and has not been tampered with (step 603). A method of verifying an electronic signature can be performed using the public key cryptosystem.

If verification of the electronic signature fails, the permit issuing server 120 sends information indicating that the issuance request is invalid to the terminal 140 (step 608), and the terminal 140 receives the result (step 609).

If verification of the electronic signature fails, the permit issuing server 120 creates a validity check permit 200 using the validity check permit creating function 125 and affixes an electronic signature of the permit issuing server to the validity check permit, as information for detecting tampering (step 604).

Identification information of the certificate issuing server and the certificate identification information 204 included in the validity check permit 200 are information included in the issuance request and identify the server 110 that issued the certificate of the user A and the certificate of the user A, respectively.

The permit issuing server 120 adds the data of the created validity check permit 200 to the issued validity check permit table 300 (step 605).

The permit issuing server 120 sends the validity check permit 200 to the terminal 140 of the user A using the validity check permit sending/receiving function 126 via the network (step 606).

The permit issuing server 120 sends accounting information (payer's identification information, receiver's identification information, charged amounts, and occurrence reason) to the settlement server 190 (step 610).

The terminal 140, using the validity check permit sending/receiving function 146, receives the validity check permit sent from the permit issuing server 120 (step 607).

The settlement server 190, using the accounting information receiving function 195, receives the accounting information sent from the permit issuing server 120 and adds the received accounting information to the accounting information table 1500 after adding an occurrence date (step 611).

When the certificate is used, for example, to send an electronic document, provided with the electronic signature of the user A, to the terminal 150 of the user B, who is to be told that the certificate of the user A is valid, the terminal 140 sends the validity check permit 200 using the validity check permit sending/receiving functions 146 via the network (step 701).

The terminal 150, using the validity check permit sending/receiving function 156, receives the validity check permit 200 sent from the terminal 140 (step 702).

The terminal 150 fetches identification information 205 of certificate validity checking server from the validity check permit 200 (step 703), and it sends a certificate validity check request and the validity check permit 200, using the validity check permit sending/receiving function 156, to a validity checking server 130 by the fetched identification information (step 704).

The certificate validity checking server 130, using the validity check permit receiving function 135, receives the validity check permit 200 sent from the terminal 150 (step 705).

The certificate validity checking server 130, using the validity check permit inspection function 136, checks whether the received validity check permit 200 is valid (step 706). After inspection of all items or after a proper type of inspection is conducted, if it is determined that all items are correct, the certificate validity checking server 130, for the certificate validity check request, checks for the validity of the certificate. However, if it is determined by the inspection that the validity check permit 200 is incorrect and invalid, the certificate validity checking server 130 does not check for the validity of the certificate and to the terminal 150 a result indicating that the certificate validity checking processing cannot be performed (step 710), and the terminal 150 receives this result (step 711).

The certificate validity checking server 130 sends accounting information (payer's identification information, receiver's identification information, charged amounts, and occurrence reason) to the settlement server 190 (step 712). The settlement server 190, using the accounting information receiving function 195, receives the accounting information sent from the certificate validity checking server 130 and adds the received accounting information to the accounting information table 1500 after adding an occurrence date (step 713).

Figure 8:
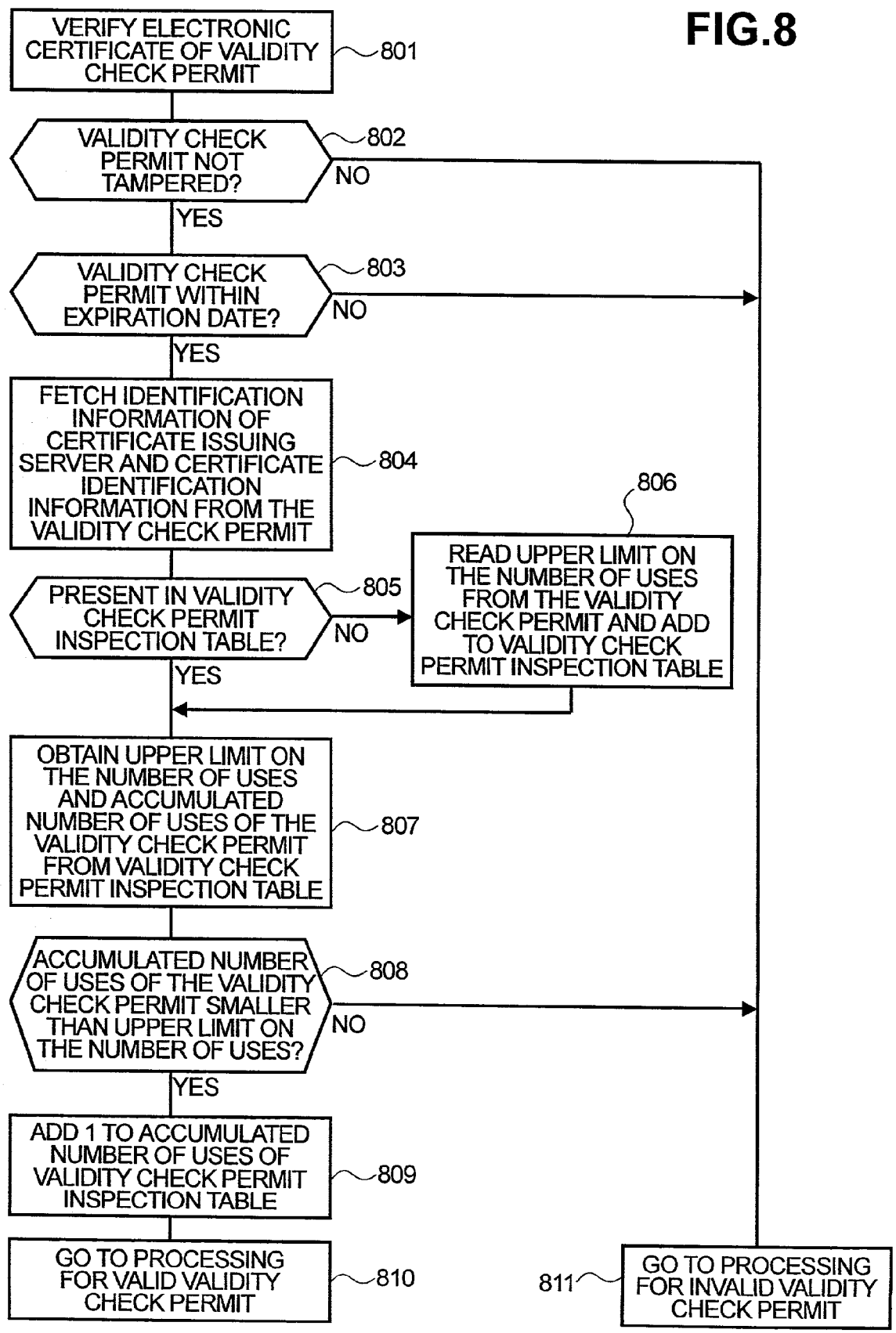
FIG. 8 is a detailed flowchart of validity check permit inspection processing in the processing in FIG. 7.

FIG. 8 is a flowchart showing in detail the processing (step 706) that checks for validity of a validity check permit. The operation of each part will be described based on the flowchart.

In the processing that checks for validity of a validity check permit, an electronic signature of the validity check permit 200 is verified (step 801), and it is determined whether the validity check permit 200 is created by the permit issuing server 120 and has not been tampered with after being created (step 802). If it has not been tampered with, the certificate validity checking server 130 reads an expiration date of validity check permit 206 included in the validity check permit 200 to check whether the expiration date has passed (step 803). If the expiration date has not passed, the certificate validity checking server 130 fetches identification information 201 of the permit issuing server and identification information 202 of the validity check permit from the validity check permit 200 (step 804), and searches the validity check permit inspection table 400 for the fetched identification information (step 805).

If no pertinent data exists in the validity check permit inspection table 400, data is newly added to the validity check permit inspection table 400 from information contained in the permit 200 (step 806).

An upper limit 403 on the number of uses and an accumulated number of uses 404 of the validity check permit are obtained from the validity check permit inspection table 400 (step 807). If the accumulated number of uses 404 is smaller than the upper limit 403 on the number of uses, the certificate validity checking server 130 adds "1" to the accumulated number of uses 404 of the validity check permit inspection table 400 (step 809).

The certificate validity checking server 130 fetches identification information 203 of the certificate issuing server and certificate identification information 204 from the validity check permit 200 (step 707) and checks for the validity of a certificate identified by the fetched identification information (step 708).

Certificate validity checking processing can be achieved using the public key cryptosystem. For example, one method is to obtain and refer to a CRL issued by a certificate issuing server to check whether the CRL is provided with a certificate indicating validity.

The certificate validity checking server 130 sends the result of validity checking processing to the terminal 150 after affixing an electronic signature to it (step 709), and the terminal 150 receives the result (step 711).

Although, in the above-described first embodiment, the use of a validity check permit is limited by the combination of an expiration date and an upper limit on the number of uses of a validity check permit, limitation methods are not limited to this. For example, the use of a validity check permit may be limited simply by an expiration date or merely by an upper limit on the number of uses, or it may be permitted only for a given period after the first use of the validity check permit.

Although, in the first embodiment, the validity check permit 200 holds certificate identification information 204 and use limitation information (expiration date 206 and an upper limit 207 on the number of uses) of the validity check permit, these items of information may be managed in the permit issuing server 120. In this case, the validity check permit 200 holds identification information 201 of the permit issuing server and identification information 202 of the validity check permit, and a certificate validity checking server 130 receiving the validity check permit 200 inquires of a permit issuing server identified by the identification information of the permit issuing server about certificate identification information and use limitation information of the validity check permit.

Although, in the first embodiment, the validity check permit 200 is created by the permit issuing server 120, the user A may create it. In this case, identification information 201 of permit issuing server of the validity check permit 200 is not required, and an electronic signature of the user A is affixed instead of an electronic signature 208 of the permit issuing server.

Although, in the above-described embodiment, the terminal 150 of the user B sends the validity check permit 200 to a certificate validity checking server 130 identified by identification information 205 of the certificate validity checking server included in the validity check permit 200 to request that a check be made to see if the certificate is valid, the validity check permit 200 may be sent to other equipment so that the equipment receiving it, in place of the terminal 150 will send the validity check permit 200 to the certificate validity checking server 130 to request that a check is made to see if the certificate is valid and return the check result to the terminal 150.

Although, in the above-described embodiment, accounting information is sent to the settlement server in both of the processing steps (steps 610 and 712) of permit issuance and certificate validity checking, accounting information may be sent in only one of these processing steps.

Second Embodiment

A second embodiment will be described based on the configuration of the first embodiment.

The following points are different between the system configuration in the first embodiment of FIG. 1 and a system configuration in the second embodiment.

(a) The permit issuing server 120 is not required.

(b) The validity check permit sending/receiving functions 146 and 156 of each terminal, the validity check permit receiving function 136 and validity check permit inspection function 137 of the certificate validity checking server 130 are not required.

(c) A permission registration server 180 shown in FIG. 9 has a network connection part 181 which is connected to the network 170.

The permission registration server 180 is an apparatus that allow users to have the certificate validity checking server 130 perform certificate validity checking processing. It is controlled by a control unit 182 and has a program 184, having a signature verification function 185, and a validity check permission registration table 1000 within a storage unit 183.

FIG. 10 is a diagram showing the data structure of the validity check permission registration table 1000. The validity check permission registration table 1000 consists of identification information 1001 of a permittee, identification information 1002 of a certificate issuing server, certificate identification information 1003, registration expiration date 1004, an upper limit 1005 on the number of uses, and an accumulated number 1006 of uses.

In this embodiment, although only one of each of the servers is shown, there may exist plural servers having an identical function. Although the servers are respectively different, they may be an identical server.

Figure 11:
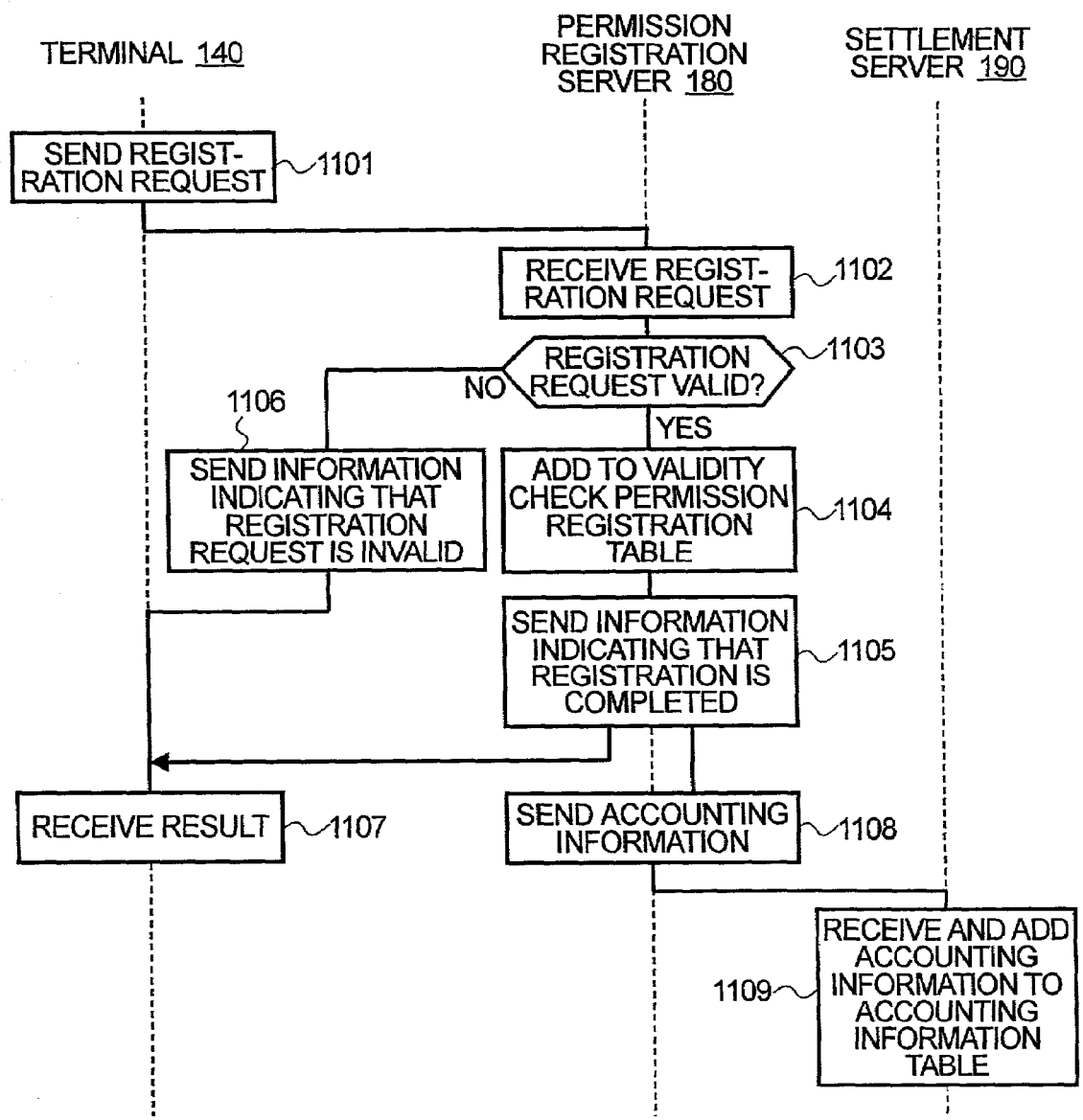
FIG. 11 is a flowchart showing a permission registration procedure of validity confirmation in a processing procedure in the second embodiment.
Figure 12:
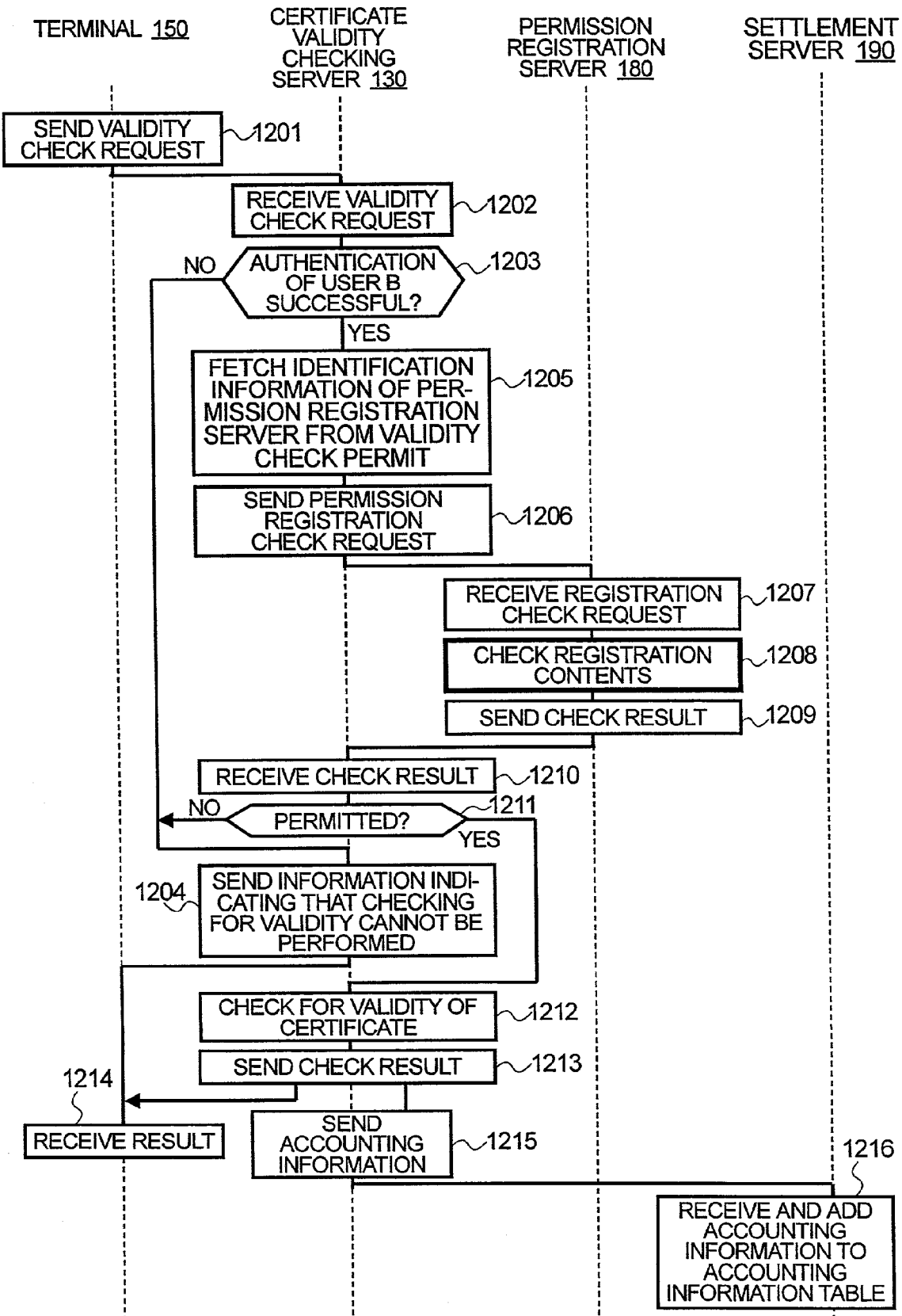
FIG. 12 is a flowchart showing a procedure for checking for validity of a certificate in the processing procedure in the second embodiment.

FIGS. 11 and 12 are flowcharts showing a processing procedure used in this embodiment. The operation of each part will be described based on the flowcharts.

The step of issuing a certificate (step 501) to the step of the terminal 140 storing the certificate (step 503) are the same as those in the first embodiment.

The terminal 140 sends a registration request to the permission registration server 180 (step 1101). The registration request includes identification information of a certificate issuing server that issued a certificate of user A, identification information of the certificate of user A, identification information of user B subject to permission registration, and permission limitation information, such as a deadline for permission of the validity check request and an upper limit on the number of validity check requests, and the registration request is provided with an electronic signature of user A.

The permission registration server 180 receives the registration request (step 1102) and checks whether the registration request is valid (step 1103). The check consists of a check about whether the electronic signature of user A is correct and a check about whether information contained in the registration request conforms to a predetermined format.

If the check indicates that the registration request is not valid, the permission registration server 180 sends this fact to the terminal 140 (step 1106), which receives the result (step 1107).

If the check indicates that the registration request is valid, the permission registration server 180 adds the identification information of the certificate issuing server, certificate identification information, identification information of the permittee (user B), the registration expiration date, an upper limit on the number of permitted uses, and an accumulated number of uses of "0" to the validity check permission registration table 1000 (step 1104), and sends a registration completion event to the terminal 140 (step 1105), which receives the result (step 1107).

The permission registration server 180 sends accounting information (payer's identification information, receiver's identification information, charged amounts, and occurrence reason) to the settlement server 190 (step 1108). The settlement server 190, using the accounting information receiving function 195, receives the accounting information sent from the permission registration server 180 and adds the received accounting information to the accounting information table 1500 after adding an occurrence date (step 1109).

The terminal 150 of the user B, who intends to check for validity of the certificate of the user A, sends a validity check request to the certificate validity checking server 130 (step 1201). The validity check request includes identification information of user B, identification information of a certificate issuing server that issued the certificate of the user A, identification information of the certificate of the user A, and identification information of a permission registration server in which the user B is permitted to check for validity, and is provided with an electronic signature of the user B.

The certificate validity checking server 130 receives the validity check request (step 1202) and verifies the electronic signature to authenticate the user B (step 1203).

If the authentication is unsuccessful, the certificate validity checking server 130 informs the terminal 150 that validity checking processing cannot be performed (step 1204), and the terminal 150 receives this result (step 1214).

If the authentication is successful, the certificate validity checking server 130 reads identification information of permission registration server from the validity check request (step 1205), and, in order to determine whether the user B is permitted to check for validity of the certificate of the user A, it sends a permission registration check request to the permission registration server 180 (step 1206). The permission registration check request includes identification information of the user B, identification information of a server that issued the certificate of the user A, and identification information of the certificate of the user A.

The permission registration server receives the permission registration check request (step 1207), searches the validity check permission registration table for the request, checks the registration contents (step 1208), and sends a check result to the certificate validity checking server 130 (step 1209).

Figure 13:
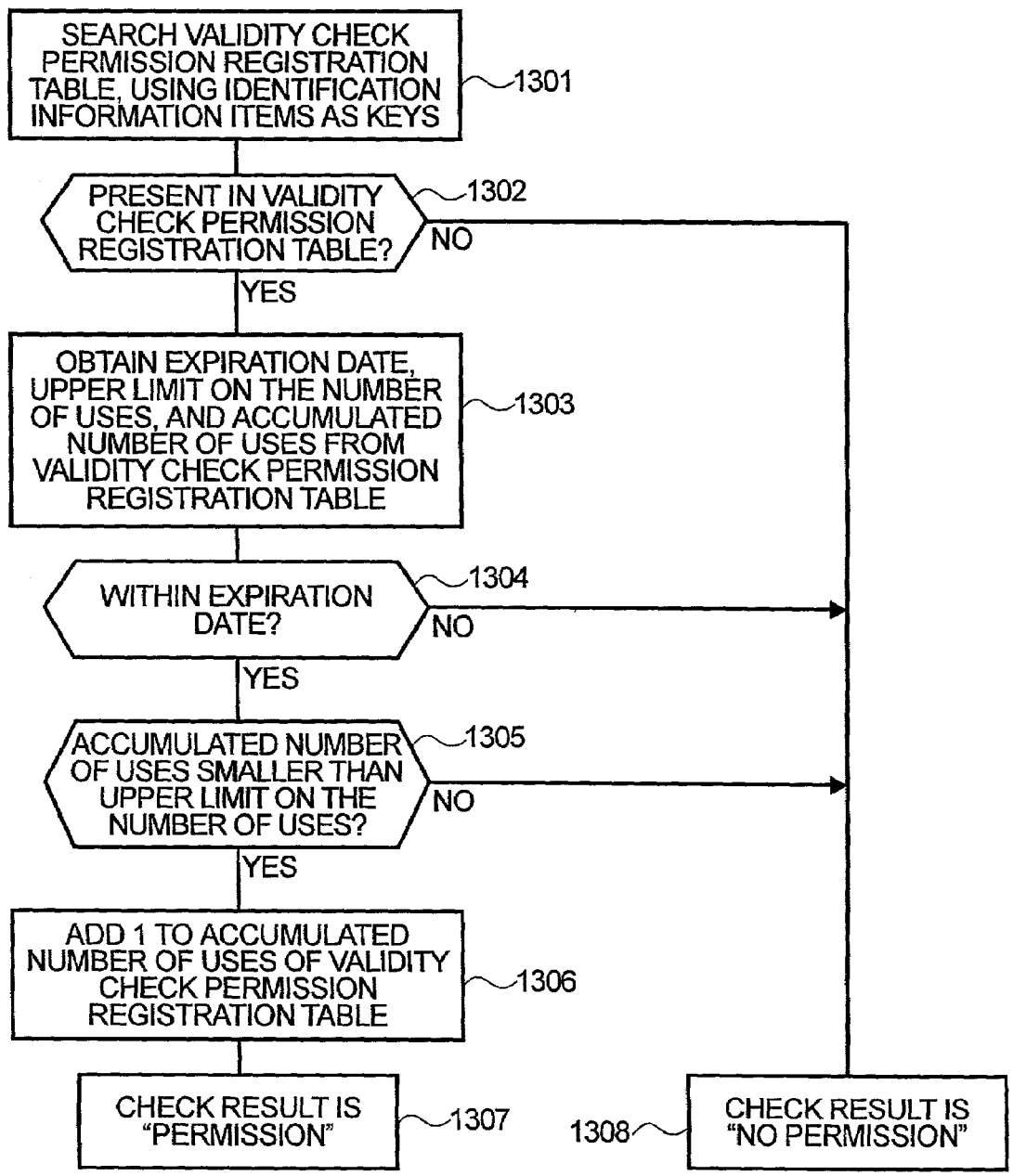
FIG. 13 is a detailed flowchart of registration content check processing of validity check permission registration in the processing in FIG. 12.

FIG. 13 is a flowchart showing details of the permission registration content checking processing (step 1208). The processing procedure of step 1208 will be described based on the flowchart. To check the registration contents of the validity check permission registration table 1000, identification information of a server that issued the certificate of the user A, identification information of the certificate of the user A, and identification information of the user B are respectively used to search the items of identification information 1002 of the certificate issuing server, certificate identification information 1003, and identification information 1001 of the permittee of the validity check permission registration table 1000 (step 1301).

If no pertinent data exists in the validity check permission registration table 1000, the result of checking is "no permission" (step 1308).

If pertinent data exists in the validity check permission registration table 1000, the registration expiration date 1004, an upper limit 1005 on the number of uses, and an accumulated number 1006 of uses are obtained from the data (step 1303).

Next, it is checked whether the registration expiration date 1004 has passed (step 1304). If the registration expiration date 1004 has passed, the result of registration content checking is "no permission" (step 1308).

If the registration expiration date 1004 has not passed, it is checked whether the accumulated number 1006 of uses is smaller than the upper limit 1005 on the number of uses (step 1305). If the accumulated number 1006 of uses is equal to or greater than the upper limit 1005 on the number of uses, the result of registration content checking is "no permission" (step 1308). If it is smaller than the upper limit 1005 on the number of uses, "1" is added to the accumulated number of uses of the validity check permission registration table 1000 (step 1306), and the result of registration content checking is "permission" (step 1307).

The certificate validity checking server 130 receives the check result for the permission registration check request from the permission registration server 180 (step 1210).

The check result is read (step 1211). If the check result is "no permission", the certificate validity checking server 130 informs the terminal 150 that validity check processing cannot be performed (step 1204), and the terminal 150 receives this result (step 1214).

If the check result is "permission", the certificate validity checking server 130 checks whether a certificate, identified by identification information 203 of the certificate issuing server and certificate identification information 204 included in the validity check request, is valid (step 1212), and sends the result of the validity check processing to the terminal 150 after affixing an electronic signature to the result (step 1213), and the terminal 150 receives the result (step 1215).

The certificate validity checking server 130 sends accounting information (payer's identification information, receiver's identification information, charged amounts, and occurrence reason) to the settlement server 190 (step 1215). The settlement server 190, using the accounting information receiving function 195, receives the accounting information sent from the certificate validity checking server 130, and adds the received accounting information to the accounting information table 1500 after adding an occurrence date (step 1216).

Although, like the variation of the first embodiment, the use of a validity check permit is limited by combination of an expiration date and an upper limit on the number of uses of a validity check permit, limitation methods are not limited to this.

Although, in the above-described embodiment, accounting information is sent to the settlement server in both of the processing steps (steps 610 and 712) of permission registration and certificate validity checking, accounting information may be sent in only one of the processing steps.

Third Embodiment

A third embodiment will be described based on the configuration of the first embodiment.

The following points are different between the system configuration in the first embodiment of FIG. 1 and the system configuration in the third embodiment.

(a) The permit issuing server 120 is not required.

(b) The validity check permit sending/receiving functions 146 and 156 of each terminal, the validity check permit receiving function 136 and validity check permit inspection function 137 of the certificate validity checking server 130 are not required.

Figure 14:
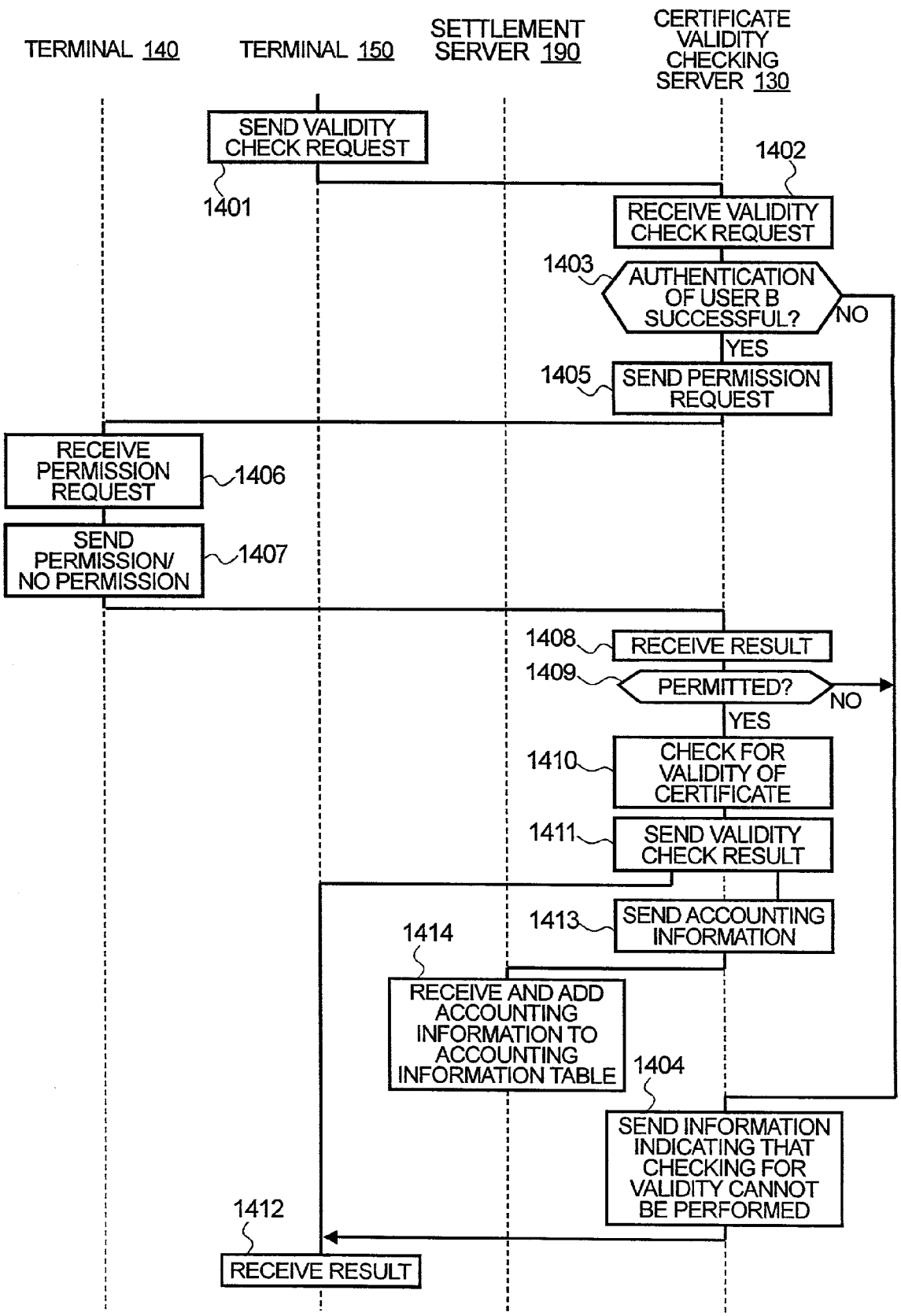
FIG. 14 is a flowchart showing a processing procedure according to a third embodiment of the present invention.

FIG. 14 is a flowchart showing the processing procedure used in this embodiment. The operation of each part will be described based on the flowcharts.

The step of issuing a certificate (step 501) to the step of the terminal 140 storing the certificate (step 503) are the same as those in the first embodiment.

The terminal 150 of the user B, who intends to check for validity of the certificate of the user A, sends a validity check request to the certificate validity checking server 130 (step 1401). The validity check request includes identification information of a certificate issuing server that issued the certificate of the user A, and identification information of the certificate of the user A, and the validity check request is provided with an electronic signature of the user B.

The certificate validity checking server 130 receives the validity check request (step 1402) and verifies the electronic signature to authenticate the user B (step 1403).

If the authentication is unsuccessful, the certificate validity checking server 130 informs the terminal 150 that validity checking processing cannot be performed (step 1404), and the terminal 150 receives this result (step 1212).

If the authentication is successful, the certificate validity checking server 130 sends a permission request to the terminal 140 of the user A (step 1405). The permission request includes identification information of the user B.

The terminal 140 receives the permission request (step 1406), and sends, to the certificate validity checking server 130, the result of "permission" or "no permission" to indicate whether the user B identified by identification information included in the permission request is permitted to check for validity of the certificate (step 1407).

The certificate validity checking server 130 receives the result from the terminal 140 (step 1408) and checks the result (step 1409).

If the result of the permission request is "no permission", the certificate validity checking server 130 informs the terminal 150 that validity check processing cannot be performed, as a result of the certificate validity check request (step 1404), and the terminal 150 receives the result (step 1212).

If the result of the permission request is "permission", the certificate validity checking server 130 checks whether a certificate identified by identification information of a certificate issuing server and certificate identification information included in the validity check request is valid (step 1410), and sends a validity check result to the terminal 150 (step 1411), and the terminal 150 receives the certificate validity check result.

The certificate validity checking server 130 sends accounting information (payer's identification information, receiver's identification information, charged amounts, and occurrence reason) to the settlement server 190 (step 1413). The settlement server 190, using the accounting information receiving function 195, receives the accounting information sent from the certificate validity checking server 130, and adds the received accounting information to the accounting information table 1500 after adding an occurrence date (step 1414).

Embodiments in which the present invention is applied to methods of checking for validity of public key certificates have been described above. The following effects, for example, are obtained by these methods.

Since charges paid by certificate users are fixed utilization charges, such as the amount of issuance of certificate, monthly amounts, and yearly amounts, the charges have been high to users using certificates less frequently.

Where users are charged according to the number of certificate validity check processings, persons who access a validity check request, and the certifyees of certificates may be included in candidates for being charged.

Although persons who access a validity check request can be identified by affixing an electronic signature of the accessing persons to the validity check request using an optional function of OSCP, in some cases, it may be difficult to identify accessing persons because they do not have a certificate, or for other reasons. The certifyees of certificates can be easily identified by consulting an authentication station that issued the certificates.

If no limitation is placed on validity check processing, the validity check processing may be performed also for requests from users who are not assumed to check for validity of a certificate, or requests in an unexpected situation.

According to the present invention, by limiting execution of certificate validity check processing according to the will of the certifyees of certificates, validity check processing unnecessary for the certifyees of certificates can be prevented, and the certifyees of certificates can be charged according to the number of executions of certificate validity check processing.

Although three embodiments have been described using examples which include checking for the validity of a public key certificate, the present invention can also be used for services in client and server systems that perform communications through various networks.

For example, for the service of browsing a database in a server, the present invention can be applied to limit a user's browsing by other users. Also, the present invention can be applied to service providing method that transfers the right to use server-provided online services from one user (service provider) to other users (service recipients) with limitations imposed by the service provider.

The present invention makes it possible for a service providing apparatus to appropriately perform information processing for service provision.

The invention claimed is:

1. An electronic certificate system that uses an electronic certificate, comprising:
   a first user apparatus used by an issuee of the electronic certificate;
   a second user apparatus, connected with the first user apparatus over a network, that receives required data and the electronic certificate that are sent from the first user apparatus; and
   a certificate validity checking apparatus, connected with the network, that receives request information indicating a request to check for validity of the electronic certificate and validity check permission information indicating that checking for validity of the electronic certificate is permitted, which are sent from the second user apparatus; detects an expiration date of a validity check permit and an upper limit on a number of uses of the validity check permit based on the received validity check permission information; checks whether the expiration date has not passed and whether an accounted number of uses of the validity check permission is smaller than the upper limit; if the expiration date has not passed and the accounted number is smaller than the upper limit, checks for validity of the electronic certificate; and sends the result of the check processing to the second user apparatus.

2. The electronic certificate system according to claim 1, wherein the first user apparatus receives the validity check permission information sent over the network and sends the received validity check permission information to the second user apparatus.

3. The electronic certificate system according to claim 2, further comprising: a certificate issuing apparatus that connects to the first user apparatus over the network and sends the electronic certificate to the first user apparatus over the network,
   wherein the first user apparatus receives the electronic certificate and the validity check permission information from the certificate issuing apparatus.

4. The electronic certificate system according to claim 2, wherein the first user apparatus receives the electronic certificate and the validity check permission information from the validity checking apparatus.

5. The electronic certificate system according to claim 1, wherein:
   the first user apparatus sends, to the validity checking apparatus, identification information for identifying an information processing apparatus that permits checking for validity of the electronic certificate; and
   the validity checking apparatus stores the sent identification information, and if the second user apparatus is identified by the stored identification information, then the validity checking apparatus checks for validity of the electronic certificate.

6. The electronic certificate system according to claim 5, wherein:
   the first user apparatus sends, to the validity checking apparatus, an issuance request to issue the electronic certificate and the identification information for identifying an information processing apparatus that permits checking for validity of the electronic certificate, issued according to the issuance request; and
   the validity checking apparatus stores the identification information, issues the electronic certificate according to the issuance request from the first user apparatus, and sends the issued electronic certificate to the first user apparatus.

7. The electronic certificate system according to claim 5, wherein:
   the second user apparatus sends, to the validity checking apparatus, the request information and user apparatus identification information for identifying the second user apparatus; and
   if the user apparatus identification information is included in the stored identification information, the validity checking apparatus checks for validity of the electronic certificate.

8. The electronic certificate system according to claim 1, wherein:
   the validity checking apparatus, upon receipt of the request information from the second user apparatus, sends to the first user apparatus inquiry information about whether checking for validity of the electronic certificate is required;
   the first user apparatus sends, to the validity checking apparatus, reply information, corresponding to the inquiry information, that indicates whether checking for validity of the electronic certificate is required; and
   the validity checking apparatus checks for validity of the electronic certificate according to the reply information.

9. The electronic certificate system according to claim 8, wherein:
   the second user apparatus sends, to the validity checking apparatus, the request information and user apparatus identification information for identifying the second user apparatus; and
   the validity checking apparatus sends, to the first user apparatus, the inquiry information and the user apparatus identification information.

10. An electronic certificate system according to claim 1, wherein
    the certificate validity checking apparatus has a table that includes identification information of an issuer of the validity check permission information, identification information the validity check permission information, the accounted number of uses of the validity check permission and the upper limit on the number of uses of the validity check permit, and
    the certificate validity checking apparatus checks whether the expiration date has not passed, reads out the identification information of the issuer of the validity check permission information and the identification information the validity check permission information from the validity check permission information if the expiration date has not passed, retrieves information in the table base on the read identification information of the issuer of the validity check permission and the read identification information the validity check permission information, reads out the accounted number and the upper limit from the read information in the table, checks whether the accounted number is smaller than the upper limit, and add "1" into the accounted number in the table and checks for the validity of the electronic certificate if the accounted number is smaller than the upper limit.

11. An electronic certificate system according to claim 1, wherein
    the first user apparatus sends, to a permit issuing server of the validity check permission information different from a certificate issuing server of the electronic certificate, an issuance request of the validity check permission information, wherein the issuance request includes identification information of an issuer of the electronic certificate, the expiration date of the validity check permit and the upper limit on the number of uses of the validity check permit, and the first user apparatus receives, from the permit issuing server, the validity check permission information that includes identification information of an issuer of the validity check permission information, the identification information of the issuer of the electronic certificate, identification information of the electronic certificate, the expiration and the upper limit.

12. A validity checking apparatus for an electronic certificate connected over a network with a first user apparatus used by an issuee of the electronic certificate, and a second user apparatus that is connected with the first user apparatus over the network and receives required data and the electronic certificate from the first user apparatus, the validity checking apparatus comprising:

a network connection part connected with the network; and a control unit, connected with the network connection part and a storage unit in which a program is stored, that receives request information indicating a request to check for validity of the electronic certificate and validity check permission information indicating that checking for validity of the electronic certificate is permitted, from the second user apparatus according to the program, detects an expiration date of a validity check permit and an upper limit on a number of uses of the validity check permit based on the received validity check permission information, checks whether the expiration date has not passed and whether an accounted number of uses of the validity check permission is smaller than the upper limit and if the expiration date has not passed and the accounted number is smaller than the upper limit, checks for validity of the electronic certificate, wherein the network connection part sends the result of the check processing to the second user apparatus.

13. The validity checking apparatus according to claim 12, wherein:

the network connection part sends the validity check permission information to the first user apparatus; and the sent validity check permission information is sent from the first user apparatus to the second user apparatus.

14. The validity checking apparatus according to claim 13, wherein:

the network connection part connects, over the network, with a certificate issuing apparatus that sends the electronic certificate to the first user apparatus; and the electronic certificate and the validity check permission information are sent from the certificate issuing apparatus to the first user apparatus.

15. The validity checking apparatus according to claim 13, wherein the network connection part sends the electronic certificate and the validity check permission information to the first user apparatus.

16. The validity checking apparatus according to claim 12, wherein:

the network connection part receives identification information for identifying an information processing apparatus that permits checking for validity of the electronic certificate, from the first user apparatus; and the control unit stores the sent identification information in the storage unit according to the program, and if the second user apparatus is identified by the stored identification information, then the control unit checks for validity of the electronic certificate.

17. The validity checking apparatus according to claim 16, wherein:

the network connection part receives, from the first user apparatus, an issuance request to issue the electronic certificate and the identification information for identifying an information processing apparatus that permits checking for validity of the electronic certificate, issued according to the issuance request;

the control unit, according to the program, stores the identification information in the storage unit, and issues the electronic certificate according to the issuance request from the first user apparatus; and the network connection part sends the issued electronic certificate to the first user apparatus.

18. The validity checking apparatus according to claim 16, wherein:

the network connection part receives the request information and user apparatus identification information for identifying the second user apparatus from the second user apparatus; and the control unit, according to the program, if the received user apparatus identification information is included in the stored identification information, checks for validity of the electronic certificate.

19. The validity checking apparatus according to claim 12, wherein:

the network connection part, upon receipt of the request information from the second user apparatus, sends inquiry information about whether checking for validity of the electronic certificate is required, to the first user apparatus, and receives, from the first user apparatus, reply information, corresponding to the inquiry information, that indicates whether checking for validity of the electronic certificate is required; and the control unit checks for validity of the electronic certificate according to the reply information.

20. The validity checking apparatus according to claim 19, wherein the network connection part receives the request information and user apparatus identification information for identifying the second user apparatus from the second user apparatus, and sends the inquiry information and the user apparatus identification information to the first user apparatus.

21. A validity checking apparatus according to claim 12, wherein the storage unit stores a table that includes identification information of an issuer of the validity check permission information, identification information the validity check permission information, the accounted number of uses of the validity check permission and the upper limit on the number of uses of the validity check permit, and the control unit checks whether the expiration date has not passed, reads out the identification information of the issuer of the validity check permission information and the identification information the validity check permission information from the validity check permission information if the expiration date has not passed, retrieves information in the table base on the read identification information of the issuer of the validity check permission information and the read identification information the validity check permission information, reads out the accounted number and the upper limit from the read information in the table, checks whether the accounted number is smaller than the upper limit, and adds "1" into the accounted number in the table and checks for the validity of the electronic certificate if the accounted number is smaller than the upper limit.

22. A validity checking apparatus according to claim 12, wherein the first user apparatus sends, to a permit issuing server of the validity check permission information different from a certificate issuing server of the electronic certificate, an issuance request of the validity check permission information, wherein the issuance request includes identification information of an issuer of the electronic certificate, the expiration date of the validity check permit and the upper limit on the number of uses of the validity check permit, and the first user apparatus receives, from the permit issuing server, the validity check permission information that includes identification information of an issuer of the validity check permission information, the identification information of the issuer of the electronic certificate, identification information of the electronic certificate, the expiration and the upper limit.

23. A program storable in a medium readable by a computer connected over a network with a first user apparatus used by an issuee of an electronic certificate, and a second user apparatus that is connected with the first user apparatus over the network and receives required data and the electronic certificate from the first user apparatus, the program including the following steps executed by the computer:

receiving request information indicating a request to check for validity of the electronic certificate and validity check permission information indicating that checking for validity of the electronic certificate is permitted from the second user apparatus;

detecting an expiration date of a validity check permit and an upper limit on a number of uses of the validity check permit based on the received validity check permission information;

checking whether the expiration date has not passed and whether an accounted for number of uses of the validity check permission is smaller than the upper limit;

if the expiration date has not passed and the accounted number is smaller than the upper limit, checking for validity of the electronic certificate; and sending the result of the check processing to the second user apparatus.

24. The program according to claim 23, wherein:
the computer executes the step of sending the validity check permission information to the first user apparatus; and the sent validity check permission information is sent from the first user apparatus to the second user apparatus.

25. The program according to claim 24, wherein:
the computer connects, over the network, with a certificate issuing apparatus that sends the electronic certificate to the first user apparatus; and the electronic certificate and the validity check permission information are sent from the certificate issuing apparatus to the first user apparatus.

26. The program according to claim 24, wherein the computer executes the step of sending the electronic certificate and the validity check permission information to the first user apparatus.

27. The program according to claim 23, wherein:
the computer executes the step of the network connection part receiving identification information for identifying an information processing apparatus that permits checking for validity of the electronic certificate, from the first user apparatus; and the validity checking step stores the sent identification information in the storage unit, and if the second user apparatus is identified by the stored identification information, then the validity checking step checks for validity of the electronic certificate.

28. The program according to claim 27, wherein the computer executes the steps of:

receiving, from the first user apparatus, an issuance request to issue the electronic certificate and the identification information for identifying an information processing apparatus that permits checking for validity of the electronic certificate, issued according to the issuance request;

storing the identification information in the storage unit, and issuing the electronic certificate according to the issuance request from the first user apparatus; and sending the issued electronic certificate to the first user apparatus.

29. The program according to claim 27, wherein:
the computer executes the step of receiving the request information and user apparatus identification information for identifying the second user apparatus from the second user apparatus; and the validity checking step, if the received user apparatus identification information is included in the stored identification information, checks for validity of the electronic certificate.

30. The program according to claim 23, wherein:
the computer includes the steps of:
upon receipt of the request information from the second user apparatus, sending inquiry information about whether checking for validity of the electronic certificate is required, to the first user apparatus; and receiving, from the first user apparatus, reply information, corresponding to the inquiry information, that indicates whether checking for validity of the electronic certificate is required; and the validity checking step checks for validity of the electronic certificate according to the reply information.

31. The program according to claim 30, wherein:
the computer executes the steps of:
receiving the request information and user apparatus identification information for identifying the second user apparatus from the second user apparatus; and sending the inquiry information and the user apparatus identification information to the first user apparatus.

32. A program according to claim 23, further including the following step, having a table that includes identification information of an issuer of the validity check permission information, identification information the validity check permission information, the accounted number of uses of the validity check permission and the upper limit on the number of uses of the validity check permit, and wherein the detecting step and the checking steps include the following step:

checking whether the expiration date has not passed;
reading out identification information of the issuer of the validity check permission information and the identification information the validity check permission information from the validity check permission information if the expiration date has not passed;

retrieving information in the table base on the read identification information of the issuer of the validity check permission information and the read identification information the validity check permission information;

reading out the accounted number and the upper limit from the read information in the table;

checking whether the accounted number is smaller than the upper limit; and adding "1" into the accounted number in the table and checking for the validity of the electronic certificate if the accounted number is smaller than the upper limit.

33. A program according to claim 23, wherein the first user apparatus sends, to a permit issuing server of the validity check permission information different from a certificate issuing server of the electronic certificate, an issuance request of the validity check permission information, wherein the issuance request includes identification information of an issuer of the electronic certificate, the expiration date of the validity check permit and the upper limit on the number of uses of the validity check permit, and the first user apparatus receives, from the permit issuing server, the validity check permission information that includes identification information of an issuer of the validity check permission information, the identification information of the issuer of the electronic certificate, identification information of the electronic certificate, the expiration and the upper limit.

34. A certificate validity checking method that uses a system in which plural terminals and a server apparatus are connected with each other over a network, and for requesting to check for validity of an electronic certificate delivered from a terminal included in the plural terminals, and that allows the server apparatus to check for validity of the certificate, the method including the steps of:

sending validity check permission information indicating that a first terminal included in the plural terminals permits checking for validity of the certificate in the server apparatus, and the certificate to a second terminal included in the plural terminals;

the second terminal receiving the validity check permission information and the certificate and sending the validity check permission information and a request to check for validity of the certificate to the server apparatus; and the server apparatus receiving the validity check permission information sent from the second terminal, detecting an expiration date of validity check permit and an upper limit on a number of uses of the validity check permit based on the received validity check permission information, checking whether the expiration date has not passed and whether an accounted number of uses of the validity check permission is smaller than the upper limit and if the expiration date has not passed and the accounted number is smaller than the upper limit, checking for validity of the certificate.

35. The certificate validity checking method according to claim 34, further including the step of issuing the information and the step of issuing the certificate.

36. A certificate validity checking method according to claim 34, further including the following step, having a table that includes identification information of an issuer of the validity check permission information, identification information the validity check permission information, the accounted number of uses of the validity check permission and the upper limit on the number of the uses of the validity check permit, and wherein the detecting step and the checking step include the following step:

checking whether the expiration date has not passed;

reading out the identification information of the issuer of the validity check permission information and the identification information the validity check permission information from the validity check permission information if the expiration date has not passed;

retrieving information in the table base on the read identification information of the issuer of the validity check permission information and the read identification information the validity check permission information;

reading out the accounted number and the upper limit from the read information in the table;

checking whether the accounted number is smaller than the upper limit; and adding "1" into the accounted number in the table and checking for the validity of the electronic certificate if the accounted number is smaller than the upper limit.

37. A certificate validity checking method according to claim 34, wherein the first user terminal sends, to a permit issuing server of the validity check permission information different from a certificate issuing server of the electronic certificate, an issuance request of the validity check permission information, wherein the issuance request includes identification information of an issuer of the electronic certificate, the expiration date of the validity check permit and the upper limit on the number of uses of the validity check permit, and the first user terminal receives, from the permit issuing server, the validity check permission information that includes identification information of an issuer of the validity check permission information, the identification information of the issuer of the electronic certificate, identification information of the electronic certificate, the expiration and the upper limit.

* * * * *